(12) United States Patent
Güntherberg et al.

(10) Patent No.: US 6,177,517 B1
(45) Date of Patent: *Jan. 23, 2001

(54) THERMOPLASTIC MOLDING MASSES BASED ON GRAFT COPOLYMERS AND BLOCK POLYMERS

(75) Inventors: Norbert Güntherberg, Speyer; Martin Weber, Neustadt; Konrad Knoll, Ludwigshafen, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/849,901
(22) PCT Filed: Dec. 22, 1995
(86) PCT No.: PCT/EP95/05094
§ 371 Date: Jun. 18, 1997
§ 102(e) Date: Jun. 18, 1997
(87) PCT Pub. No.: WO96/20249
PCT Pub. Date: Jul. 4, 1996

(30) Foreign Application Priority Data

Dec. 27, 1994 (DE) .................................. 44 46 896

(51) Int. Cl.⁷ ............................. C08L 31/02; C08L 51/00; C08G 63/48; C08G 63/91
(52) U.S. Cl. ................. 525/80; 525/67; 525/71; 525/75; 525/84; 525/86
(58) Field of Search ................................ 525/71, 86, 84, 525/67, 80, 75

(56) References Cited

U.S. PATENT DOCUMENTS

| | | | |
|---|---|---|---|
| 5,089,558 | 2/1992 | Hall | 525/89 |
| 5,760,134 | * 6/1998 | Güntherberg et al. | 525/71 |
| 5,877,258 | * 3/1999 | Güntherberg et al. | 525/71 |

FOREIGN PATENT DOCUMENTS

| | | |
|---|---|---|
| 582 349 | 2/1994 | (EP) . |
| 2 056 465 | 3/1981 | (GB) . |

* cited by examiner

Primary Examiner—Patrick D. Niland
(74) Attorney, Agent, or Firm—Keil & Weinkauf

(57) ABSTRACT

Thermoplastic molding masses made of thermoplastic polymers obtained by mixed graft polymerization and having a glass transition temperature above 20 C., and of special rubber-elastic block copolymers, are characterized by a balanced spectrum of properties.

11 Claims, No Drawings

THERMOPLASTIC MOLDING MASSES BASED ON GRAFT COPOLYMERS AND BLOCK POLYMERS

The present invention relates to thermoplastic molding compositions comprising

A) from 5 to 98% by weight, based on the total weight of the molding composition, of an elastomeric graft copolymer built up from $a_1$) from 30 to 90% by weight, based on A), of a graft base $a_1$) built up from $a_{11}$) an at least partially crosslinked acrylate polymer formed from $a_{111}$) from 50 to 99.9% by weight, based on $a_{11}$), of at least one $C_1$–$C_{10}$-alkyl acrylate, $a_{112}$) from 0.1 to 5% by weight, based on all), of a polyfunctional crosslinking monomer and $a_{113}$) from 0 to 49.9% by weight, based on all), of a further monomer which is copolymerizable with $a_{111}$) selected from the group consisting of the vinyl $C_1C_8$-alkyl ethers, butadiene, isoprene, styrene, acrylonitrile and methacrylonitrile, and/or methyl methacrylate and/or $a_{12}$) a diene polymer built up from $a_{121}$) from 50 to 100% by weight, based on $a_{12}$), of a diene and $a_{122}$) from 0 to 50% by weight, based on $a_{12}$), of other copolymerizable monomers selected from the group consisting of the vinyl $C_1$–$C_8$-alkyl ethers, $C_1$–$C_{10}$-alkyl acrylates, isoprene, styrene, acrylonitrile and methacrylonitrile, and/or methyl methacrylate, and $a_2$) from 10 to 70% by weight, based on A), of a shell grafted onto the graft base, built up from $a_{21}$) from 50 to 95% by weight, based on $a_2$), of a vinylaromatic monomer, $a_{22}$) from 5 to 50% by weight of polar, copolymerizable comonomers selected from the group consisting of acrylonitrile, methacrylo-nitrile, $C_1$–$C_4$-alkyl (meth)acrylates, maleic anhydride and maleimides, and (meth)acryl-amide, and/or vinyl $C_1$–$C_8$-alkyl ethers, B) from 1 to 90% by weight, based on the total weight of the molding composition, of a copolymer made from $b_1$) from 50 to 99% by weight of a vinylaromatic monomer and $b_2$) from 1 to 50% by weight of monomers as described for $a_{22}$), C) from 1 to 70% by weight of an elastomeric block copolymer comprising at least one block CA which forms a hard phase and has in its polymer chain units of a vinylaromatic monomer and/or of a block CB which forms a first elastomeric (soft) phase and comprises diene monomers and at least one elastomeric block $C_{B/A}$ which forms a (if appropriate second or further) soft phase, and has in its polymer chain units of both a vinylaromatic monomer and a diene, where the glass transition temperature $T_g$ of the block $C_A$ is above 25° C. and that of the block $C_{B/A}$ is below 25° C. and the phase-volume ratio of block $C_A$ to block $C_{B/A}$ is selected so that the proportion of the hard phase in the entire block copolymer is from 1 to 40% by volume, and the proportion by weight of the diene is less than 50% by weight, D) from 0 to 300% by weight, based on the weight of components A) to C), of an aromatic polycarbonate, E) from 0 to 20% by weight, based on the total weight of the molding composition, of conventional additives and processing aids.

Mixtures of thermoplastic polymers based on vinylaromatic polymers and graft elastomers are known to the person skilled in the art as ABS or ASA polymers, and are commercially available. Blends of such ASA and/or ABS polymers with other thermoplastics, in particular polycarbonates, are also known.

Owing to the introduction of ever faster processing machinery, such products of this type are expected to have, in particular, high flowability in injection molding and the ability to be demolded without breaking. In shaping by thermoforming, a high elongation at break is particularly important.

Various additives are generally used to optimize these properties, but these frequently improve only one parameter and in doing so impair another desired property. Thus additives for improving flowability and thermoforming properties frequently impair mechanical properties, whereas additives for improving demolding often impair flowability.

It is an object of the present invention, therefore, to provide thermoplastic molding compositions based on ABS polymers or ASA polymers which have a balanced property profile.

We have found that this object is achieved by means of the thermoplastic molding compositions as claimed in claim 1.

Preferred embodiments of the invention are seen in the subclaims.

The novel molding compositions contain, as component A, from 5 to 98% by weight, preferably from 10 to 90% by weight, and in particular from 20 to 80% by weight, based on the total weight of the molding compositions, of an elastomeric graft copolymer.

This graft copolymer is built up from a graft base $a_1$) with a glass transition temperature $T_g$ of below –10° C. and a graft $a_2$) with a glass transition temperature $T_g$ of above 50° C., the proportion of the graft base $a_1$) is from 30 to 90% by weight, preferably from 35 to 85% by weight, and in particular from 40 to 80% by weight, and that of the graft is correspondingly from 10 to 70% by weight, preferably from 15 to 65% by weight, and in particular from 20 to 60% by weight. The construction of the graft polymer A) is described in more detail below.

The graft base $a_1$) is built up from $a_{11}$) an at least partially crosslinked acrylate polymer formed from $a_{111}$) from 50 to 99.9% by weight, based on all), of at least one $C_1$–$C_{10}$-alkyl acrylate, $a_{112}$) from 0.1 to 5% by weight, based on all), of a polyfunctional crosslinking monomer and $a_{113}$) from 0 to 49.9% by weight, based on all), of a further monomer which is copolymerizable with $a_{111}$) selected from the group consisting of the vinyl $C_1$–$C_8$-alkyl ethers, butadiene, isoprene, styrene, acrylonitrile and methacrylonitrile, and/or methyl methacrylate and/or $a_{12}$) a butadiene polymer built up from a121) from 50 to 100% by weight, based on $a_{12}$), of one or more dienes and $a_{122}$) from 0 to 50% by weight, based on $a_{12}$), of further copolymerizable monomers selected from the group consisting of the vinyl $C_1$–$C_8$-alkyl ethers, $C_1$–$C_{10}$-alkyl acrylates, isoprene, styrene, acrylonitrile and methacrylonitrile, and/or methyl methacrylate.

Thus the molding compositions which can be used according to the invention comprise, in component A, either only one polymer $a_{11}$) or $a_{12}$) or a mixture of two polymers $a_{11}$) and $a_{12}$) as graft base.

When mixtures of polymers $a_{11}$) and $a_{12}$) are used, the mixing ratio is not critical, but is in general in the range from 4:1 to 1:4, in particular from 1:2 to 2:1.

The acrylate polymers aI1) are built up from $a_{111}$), from 50 to 99.9% by weight, preferably from 55 to 98% by weight, and in particular from 60 to 90% by weight, of a $C_1$–$C_{10}$-alkyl acrylate. $C_2$–$C_{10}$-alkyl acrylates are preferred, in particular ethyl acrylate, tert-, iso- and n-butyl acrylate and 2-ethylhexyl acrylate, the two last-mentioned being very particularly preferred.

Particular examples of crosslinking monomers $a_{112}$) used in amounts of from 0.1 to 5% by weight, preferably from 0.25 to 4% by weight, and in particular from 0.5 to 3% by weight, based on aI1), are polyfunctional monomers having at least 2 non-conjugated olefinic double bonds, such as divinylbenzene, dialkyl fumarate, diallyl phthalate, triallyl cyanurate, trialkyl isocyanurate, tricyclodecenyl acrylate and dihydrodicyclopentadienyl acrylate. Tricyclodecenyl acrylate and dihydrodicyclopentadienyl acrylate are particularly preferred.

Other monomers $a_{113}$) which may be used in the preparation of $a_{11}$) are up to 49.9% by weight, preferably from 5 to 44.9% by weight, and in particular from 10 to 39.9% by weight of monomers which are copolymerizable with $a_{111}$) selected from the group consisting of the vinyl $C_1$–$C_8$-alkyl ethers (eg. vinyl methyl ether, vinyl propyl ether, vinyl ethyl ether), butadiene, isoprene, styrene, acrylonitrile and methacrylonitrile and/or methacrylonitrile.

The use of comonomers of this type allows the property profile of the polymers aI1) to be controlled, eg. with respect to degree of crosslinking, which control can be desirable in many cases.

Processes for preparing polymers aI1) are known to the person skilled in the art and are described in the literature. Products of this type are also commercially available.

In a number of cases, preparation by emulsion polymerization has proven particularly advantageous.

In the preparation of the graft copolymer by the method described in DE-C-12 60 135, the graft base A is first prepared; if the graft base is to be an acrylate rubber, the acrylate(s) $a_{111}$), the polyfunctional monomer $a_{112}$) and, if used, the monomer $a_{113}$) are polymerized in aqueous emulsion at from 20 to 100° C., preferably from 50 to 80° C. The usual emulsifiers, such as the alkali metal salts of alkyl- and alkylarylsulfonic acids, alkyl sulfates, fatty alcohol sulfonates, salts of higher fatty acids having from 10 to 30 carbon atoms, or resin soaps, may be used. Preference is given to the sodium or potassium salts of alkylsulfonic acids or of fatty acids having from 10 to 18 carbon atoms. It is advantageous to employ the emulsifiers in an amount of from 0.5 to 5% by weight, in particular from 1 to 2% by weight, based on the total weight of the monomers used for the preparation of the graft base. A water/monomer ratio of from 2:1 to 0.7:1 is generally used. Polymerization initiators used are in particular the customary persulfates, eg. potassium peroxodisulfate, but redox systems are also suitable. The amount of initiators (eg. from 0.1 to 1% by weight, based on the total weight of the monomers) depends, in a known manner, on the desired molecular weight.

Polymerization auxiliaries which may be used are the usual buffer substances capable of setting a pH of preferably from 6 to 9, eg. sodium bicarbonate and sodium pyrophosphate, and up to 3% by weight of a molecular weight regulator, such as a mercaptan or terpinol or dimeric α-methylstyrene.

The precise polymerization conditions, in particular the type, manner of addition and amount of emulsifier, are determined within the ranges given above so that the resultant latex of the crosslinked acrylate polymer has a $d_{50}$ in the range from about 30 to 1000 nm, preferably from 50 to 800 nm. The $d_{50}$ of the particle size is defined in the usual way as the weight average of the particle size as determined with an analytic ultracentrifuge by the method of W. Scholtan and H. Lange, Kolloid-Z. and Z.-Polymere 250 (1972) pp. 782–796. The ultracentrifuge measurement gives the integral mass distribution of the particle diameter of a specimen. From this it is possible to deduce what percentage by weight of the particles have a diameter which is the same as or less than a particular size. The mean particle diameter, also termed $d_{50}$ of the integral mass distribution, is defined as the value at which 50% by weight of the particles have a smaller, and 50% by weight of the particles a larger, diameter than the $d_{50}$.

The latex preferably has a narrow particle size distribution, ie. the quotient $$Q = \frac{d_{90} - d_{10}}{d_{50}}$$

is preferably below 0.5, in particular below 0.35.

In place of the polymers $a_{11}$), the graft copolymers A) can also comprise diene polymers $a_{12}$) as graft base. The polymers $a_{12}$) are butadiene copolymers which besides from 60 to 100% by weight, preferably from 70 to 99% by weight, of one or more dienes, preferably butadiene or isoprene, can also comprise up to 40% by weight, preferably from 2 to 30% by weight, of further copolymerizable monomers, suitable examples of which are both the alkyl acrylates described above under $a_{111}$) and the monomers $a_{113}$); for details, reference may be made to the description at those points.

If the graft core is to be a diene rubber, it is expedient to proceed as follows: the elastomer, the graft base $a_1$), is prepared by polymerizing a121) and aI$_{22}$) in aqueous emulsion in a manner known per se, at from 20 to 100° C., preferably from 50 to 80° C. The usual emulsifiers, such as alkali metal salts of alkyl- or alkylarylsulfonic acids, alkyl sulfates, fatty alcohol sulfonates, salts of higher fatty acids having from 10 to 30 carbon atoms or resin soaps, may be used. Preference is given to the sodium or potassium salts of alkyl sulfonates or of fatty acids having from 10 to 18 carbon atoms. It is advantageous to employ the emulsifiers in amounts of from 0.5 to 5% by weight, in particular from 0.5 to 2% by weight, based on the monomers employed in the preparation of the graft base $a_1$). A ratio of water to monomers of from 2:1 to 0.7:1 is generally used. Polymerization initiators used are in particular the customary persulfates, such as potassium persulfate, but redox systems can also be used. The initiators are generally employed in amounts of from 0.1 to 1% by weight, based on the monomers employed in the preparation of the graft base $a_1$). Further polymerization auxiliaries which may be used are the usual buffers capable of setting a pH of preferably from 6 to 9, eg. sodium bicarbonate and sodium pyrophosphates; 0.1% to 3% by weight of a molecular weight regulator, such as mercaptans or terpinols or dimeric α-methylstyrene, can furthermore generally be used in the polymerization.

The precise polymerization conditions, in particular the type, method of addition and amount of the emulsifier, are selected individually within the ranges given above so that the resultant latex of the diene polymer $a_{12}$) has a $d_{50}$ (cf. above) in the range from about 100 to 750 nm, preferably from 100 to 600 nm. Alternatively, an emulsion polymer with mean particle sizes in the range from 60 to 150 nm can also be agglomerated as described, for example, in DE-B-2427960.

A graft shell $a_2$) is grafted onto the graft base a11) and/or $a_{12}$) and is obtained by copolymerization of $a_{21}$) from 50 to 95% by weight, preferably from 60 to 90% by weight, in particular from 65 to 80% by weight, of a vinylaromatic monomer, preferably styrene or substituted styrenes of the formula I

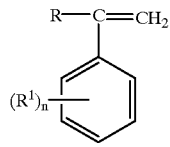

where R is $C_1$–$C_8$-alkyl, hydrogen or halogen and $R^1$ is $C_1$–$C_8$-alkyl or halogen and n is 0, 1, 2 or 3, preferably styrene, α-methylstyrene, p-methylstyrene or tert-butylstyrene, and $a_{22}$) from 5 to 50% by weight, preferably from 10 to 40% by weight, and in particular from 20 to 35% by weight, of polar copolymerizable monomers selected from the group consisting of acrylonitrile, methacrylonitrile, $C_1$–$C_4$-alkyl (meth)-acrylates, maleic anhydride and maleimides, (meth)acrylamide and/or vinyl $C_1$–$C_8$-alkyl ethers or mixtures of these.

The graft shell $a_{22}$) can be prepared in one or more, eg. in two or three, process steps, the overall formulation remaining unchanged by this.

The graft shell is preferably prepared in emulsion, as described, for example, in DE-C-1 260 135, DE-A-32 27 555, DE-A-31 49 357, DE-A-31 49 358 and DE-A-34 14 118.

Depending on the selected conditions, a certain proportion of free copolymers of styrene and acrylonitrile is formed in the graft copolymerization.

It is advantageous once again to carry out the graft copolymerization onto the polymer which serves as graft base $a_1$) in aqueous emulsion. It may be undertaken in the same system used for polymerization of the graft base, further emulsifier and initiator being added if required. These need not be identical with the emulsifers and initiators used for preparing the graft base $a_1$). For example it can be expedient to use a persulfate as initiator for preparing the graft base $a_1$) but to employ a redox initiator system for polymerizing the graft shell $a_2$). Otherwise, the factors relevant to selection of emulsifer, initiator and polymerization auxiliaries are those given for the preparation of the graft base $a_1$). The monomer mixture to be grafted can be added to the reaction mixture all at once, batchwise in several steps or preferably continuously during the polymerization. The graft copolymerization is advantageously controlled in such a manner that the resulting degree of grafting is from 10 to 60% by weight, preferably from 15 to 45% by weight.

The graft copolymer ($a_1+a_2$) generally has a mean particle size of preferably from 50 to 1000 nm, in particular from 100 to 700 nm ($d_{50}$ weight average). The conditions for preparing the elastomer $a_1$) and for grafting are therefore preferably selected so as to give particle sizes in this range. Measures for this are known and are described, for example, in DE-C-1 260 135 and DE-A 28 26 925 and in Journal of Applied Polymer Science, Vol. 9 (1965), pp. 2929–2938. The particle size increase in the elastomer latex can be achieved, for example, by means of agglomeration.

In some cases, mixtures of several acrylate polymers having different particle sizes have also proven successful. Products of this type are described in DE-A 28 26 925 and US Patent 5,196,480, to which reference may be made at this point for further details.

Preferred mixtures of acrylate polymers are therefore those in which a first polymer has a particle size $d_{50}$ in the range from 50 to 150 nm and a second polymer has a particle size of from 200 to 700 nm, as described in the U.S. Pat. No. 5,196,480 mentioned above.

Preference is also given to the use of mixtures of polymers $a_{11}$) (as described in DE-B 11 64 080, DE-PS 19 11 882 and DE-A 31 49 358) and polymers $a_{12}$), where the polymers $a_{12}$) generally have a mean particle size in the range from 50 to 1000 nm, preferably from 100 to 700 nm.

Some preferred graft polymers a11) are given below:

A/1: 60% by weight of graft base $a_{11}$) of
$a_{111}$) 98% by weight of n-butyl acrylate and
$a_{112}$) 2 % by weight of dihydrodicyclopentadienyl acrylate and
40% by weight of graft shell $a_2$) of
$a_{21}$) 75% by weight of styrene and
$a_{22}$) 25% by weight of acrylonitrile A/2: graft base as for A/1 with 5% by weight of a graft shell of
$a_{21}$) 12.5% by weight of styrene (1st graft) and 40% by weight of a second graft of
$a_{21}$) 75% by weight of styrene and
$a_{22}$) 25% by weight of acrylonitrile A/2: graft base as for A/1 with 13% by weight of a first graft of styrene and 27% by weight of a second graft of styrene and acrylonitrile in a weight ratio of 3:1.

The novel molding compositions contain, as component B), from 1 to 90% by weight, preferably from 5 to 85% by weight, particularly preferably from 10 to 80% by weight, based on the total weight of the composition, of a copolymer of $b_1$) from 50 to 99% by weight, preferably from 55 to 90% by weight, and in particular from 65 to 85% by weight, of vinylaromatic monomers, preferably styrene and/or substituted styrenes of the formula I and $b_2$) from 1 to 50% by weight, preferably from 10 to 45% by weight, and in particular from 15 to 35% by weight, of the monomers described for $a_{22}$).

Products of this type may be prepared, for example, by the processes described in DE-B 10 01 001 and DE-B 10 03 436, and are also commercially available. The weight-average molecular weight determined by light scattering is preferably in the range from 40,000 to 500,000, in particular from 100,000 to 250,000, corresponding to viscosity numbers (measured in 0.5% strength by weight solution in dimethylformamide at 25° C.) in the range from 40 to 200 ml/g, preferably from 40 to 160 ml/g.

The polymer B) can also be a mixture of different copolymers of styrene and/or α-methylstyrene and acrylonitrile, differing, for example, in their content of acrylonitrile or in their mean molar mass.

The proportion of component C) in the compositions is from 1 to 70% by weight, preferably from 2 to 50% by weight, and particularly preferably from 3 to 40% by weight, based on the total of components A), B), C) and, if used, D). Component C) is an elastomeric block copolymer of at least one block $C_A$, which forms a hard phase and has in its polymer chain, units of a vinylaromatic monomer, and/or a block $C_B$ which forms a first elastomeric (soft) phase and comprises diene monomers, and at least one block $C_{B/A}$ which forms a soft phase, and has in its polymer chain units of both a vinylaromatic monomer and a diene, where the glass transition temperature $T_g$ of the block $C_A$ is above 25° C. and that of the block $C_{B/A}$ is below 25° C. and the phase-volume ratio of block $C_A$ to block $C_{B/A}$ is selected so that the proportion of the hard phase in the entire block copolymer is from 1 to 40% by weight, and the proportion by weight of the diene is less than 50% by weight.

Details on the construction and preparation of component C) are given below and also in DE-A 44 20 952, incorporated herein by reference.

The soft phase (block $C_{B/A}$) is obtained by random copolymerization of vinylaromatic monomers and dienes in the presence of a polar cosolvent.

Examples of a block copolymer C) are any of the formulae 1 to 11:

(1) $(C_A-C_{B/A})n$;
(2) $(C_A-C_{B/A})n-C_A$, preferably $C_A-C_B/A-C_A$;
(3) $C_{B/A}-(C_A-C_{B/A})n$;
(4) $X-[(C_A-C_{B/A})_n\;]_{m+1}$;
(5) $X-[(C_B/C_A-A)_n]_{m+1}$, preferably $X-[-C_B/A-C_A]_2$;
(6) $X-[(C_A-C_{B/A})_n-C_A]_{m+1}$;
(7) $X-[(C_{B/A}-C_A)_n-C_{B/A}]_{m+1}$;
(8) $Y-[(C_A-C_{B/A})_n]_{m+1}$;
(9) $Y-[(C_{B/A}-C_A)_n]_{m+1}$; preferably $Y-[-C_{B/A}-C_A]_2$;
(10) $Y-[(C_A-C_{B/A})_n-C_A]_{m+1}$;
(11) $Y-[(C_{B/A}-C_A)_n-C_{B/A}]_{m+1}$;

where $C_A$ is the vinylaromatic block and $C_{B/A}$ is the soft phase, ie. the block built up randomly from diene units and vinylaromatic units, X is the radical of an n-functional initiator, Y is the radical of an m-functional coupling agent and m and n are natural numbers from 1 to 10.

Particular preference is given to a block copolymer whose soft phase is divided into blocks

(12) $(C_{B/A})_1-(C_{B/A})_2$;
(13) $(C_{B/A})_1-(C_{B/A})_2-(C_{B/A})_1$;
(14) $(C_{B/A})_1-(C_{B/A})_2-(C_{B/A})_3$;

whose vinylaromatic/diene ratio differs in the individual blocks $C_{B/A}$ or changes continuously within a block within the limits $(C_{B/A})_1 \rightarrow (C_{B/A})_3$, where the glass transition temperature $T_g$ of each sub-block is below 25° C.

Preference is also given to a block copolymer having a number of blocks $C_{B/A}$ and/or $C_A$ with differing molar mass in each molecule, for example in the combination (3) with (13) or (14).

Likewise, a block $C_B$ may take the place of a block $C_A$ built up exclusively from vinylaromatic units, since the essential point is solely that an elastomeric block copolymer is formed. Such copolymers can, for example, have the structure (15) to (18)

(15) $C_B-(C_{B/A})$
(16) $(C_{B/A})-C_B-(C_{B/A})$
(17) $(C_{B/A})_1-C_B-(C_{B/A})_2$
(18) $C_B-(C_{B/A})_1-(C_{B/A})_2$.

For the purposes of the invention, preferred vinylaromatic compounds are styrene, a-methylstyrene and vinyltoluene, and mixtures of these. Preferred dienes are butadiene and isoprene, piperylene and also 1-phenylbutadiene and mixtures of these.

A particularly preferred monomer combination is butadiene and styrene. All of the following weight and volume data refer to this combination.

The block $C_{B/A}$ is built up from about 75 to 30% by weight of styrene and from 25 to 70% by weight of butadiene. Particular preference is given to a soft block having a butadiene proportion of from 35 to 70% and a styrene proportion of from 65 to 30%.

The proportion by weight of the diene in the entire block copolymer, in the case of the monomer combination styrene/butadiene, is from 15 to less than 50% by weight, and that of the vinylaromatic component is correspondingly from 85 to 50% by weight. Particular preference is given to butadiene-styrene block copolymers of from 25 to less than 50% by weight of diene and from 75 to 50% by weight of vinylaromatic compound.

The block copolymers are prepared by anionic polymerization in a non-polar solvent with addition of an aprotic polar cosolvent. Preferred solvents are aliphatic hydrocarbons, such as cyclohexane and methylcyclohexane. Preferred cosolvents are in particular ethers, such as tetrahydrofuran, and aliphatic polyethers, such as diethylene glycol dimethyl ether, and tertiary amines, such as tributylamine and pyridine. The polar cosolvent is added to the non-polar solvent in a small amount, for example from 0.5 to 5% by volume. Particular preference is given to tetrahydrofuran in an amount of from 0.1 to 0.3% by volume. Experience has shown that an amount of about 0.2% by volume is adequate in most cases.

The anionic polymerization is initiated by organometallic compounds, in particular organolithium compounds, such as methyllithium, ethyllithium, propyllithium, n-butyllithium, sec-butyllithium and tert-butyllithium. The organometallic compound is added as solution in a chemically inert hydrocarbon, generally in an amount of from 0.002 to 5 mol %, based on the monomers.

The polymerization can be carried out at from 0 to 130° C., preferably at from 30 to 100° C.

According to the invention, the volume proportion in component C) of the soft phase built up from diene and vinylaromatic sequences is from 60 to 99% by volume, preferably from 70 to 95% by volume and particularly preferably from 80 to 90% by volume. The blocks $C_A$, which are made from the vinylaromatic monomers, form the hard phase, whose volume proportion is correspondingly from 1 to 40% by volume, preferably from 5 to 30% by volume, and particularly preferably from 10 to 20% by volume.

The soft phase of component C) usually has a glass transition temperature of from −50 to +25° C., preferably from −50 to +5° C.

The molar mass of the block $C_A$ is, inter alia, from 1,000 to 200,000, preferably from 3,000 to 80,000 [g/mol]. Blocks $C_A$ may have different molar masses within a molecule.

The molar mass of the block $C_{B/A}$ is usually from 2,000 to 250,000, preferably from 5,000 to 150,000 [g/mol]. Like block $C_A$, block $C_{B/A}$ can also have different molar mass values within a molecule.

The coupling center X is formed by reaction of the living anionic chain ends with an at least bifunctional coupling agent. Examples of such compounds are found in U.S. Pat. Nos. 3,985,830, 3,280,084, 3,637,554 and 4,091,053. Preference is given to the use of, for example, epoxidized glycerides, such as epoxidized linseed oil or soya oil; divinylbenzene is also suitable. Dichlorodialkyl-silanes, dialdehydes, such as terephthalaldehyde, and esters, such as ethyl formate or benzoate, are suitable specifically for dimerization.

The random block $C_{B/A}$ may itself be subdivided into blocks $C_{B1/A1}-C_{B2/A2}-C_{B3/A3}$. The random block preferably consists of from 2 to 15 random sub-blocks, particularly preferably from 3 to 10 sub-blocks.

The polymerization is carried out in a number of steps and, in the case of monofunctional initiation, is begun, for example, by preparing the hard block CA. Part of the monomers is precharged in the reactor and the polymerization is started by addition of the initiator. In order to achieve a defined chain construction, it is advisable although not essential to carry out the process to a high degree of conversion (greater than 99%) before the second monomer addition takes place.

The manner of adding the monomer depends on the selected block construction. In the case of monofunctional initiation, the vinylaromatic compound is, for example, first either precharged or directly metered in. The diene and the vinylaromatic compound should then be added, simultaneously if possible. The ratio of the amounts bf diene and vinylaromatic compound, the concentration and chemical structure of the Lewis base, and the temperature determine the random construction and the formulation of the block $C_{B/A}$. According to the invention, the proportion of the diene relative to the entire weight including the vinylaromatic compound is from 25 to 70% by weight. Block $C_A$ can then be polymerized on by adding the vinylaromatic compound. Instead of this, required polymer blocks can also be linked to one another by a coupling reaction. In the case of bifunctional initiation, the block $C_{B/A}$ is built up first, followed by the block $C_A$.

Further work-up is carried out by the usual methods. It is advisable to carry this out in a mixing vessel and to terminate the polymerization using an alcohol, such as isopropanol, to acidify slightly in the usual manner using $CO_2$/water before continuing the work-up, to stabilize the polymer with an oxidation inhibitor and a free-radical interceptor (commercially available products, such as tris-nonylphenyl phosphite (TNPP) or α-tocopherol (vitamin E) or products obtainable under the trade name Irganox 1076 or Irganox 3052), to remove the solvent by the usual methods, and extrude and granulate.

The novel thermoplastic molding compositions may contain, as component D), from 0 to 300% by weight, preferably from 0 to 200% by weight, based on the total of A), B) and C), of at least one polycarbonate.

Suitable polycarbonates are, for example, those based on diphenols of the formula II

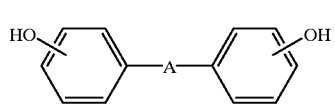

where A is a single bond, $C_1$–$C_3$-alkylene, $C_2$–$C_3$-alkylidene, $C_3$–$C_6$-cycloalkylidene, —S— or —$SO_2$—.

Preferred diphenols of the formula II are, for example, 4,4'-dihydroxydiphenyl, 2,2-bis(4-hydroxyphenyl)propane, 2,4-bis(4-hydroxyphenyl)-2-methylbutane and 1,1-bis(4-hydroxy-phenyl)cyclohexane. Particular preference is given to 2,2-bis(4-hydroxyphenyl)propane and 1,1-bis(4-hydroxyphenyl)-cyclohexane.

Both homopolycarbonates and copolycarbonates are suitable as component D); besides bisphenol A homopolymer, preference is also given to copolycarbonates of bisphenol A.

The polycarbonates which are suitable may be branched in a known manner, preferably by the incorporation of from 0.05 to 2.0 mol %, based on the total of the diphenols employed, of at least trifunctional compounds, for example those having three or more phenolic OH groups.

The polycarbonates which are suitable as component D) may, furthermore, be aromatically mono- to trisubstituted with halogen, preferably with chlorine and/or bromine, but particular preference is given to halogen-free compounds.

Polycarbonates which have proven particularly suitable are those having relative viscosities $\eta_{rel}$ of from 1.10 to 1.50, in particular from 1.25 to 1.40. This corresponds to mean molecular weights Mw (weight average) of from 10,000 to 200,000, preferably from 20,000 to 80,000.

The diphenols of formula II are known per se or can be prepared by known processes.

The polycarbonates can be prepared, for example, by reaction of the diphenols with phosgene in the interfacial process or with phosgene in the homogeneous phase process (the pyridine process), the molecular weight to be set in each case being achieved in a known manner using an appropriate amount of known chain terminators. (For polycarbonates containing polydiorganosiloxanes see for example DE-A 33 34 782.)

Suitable chain terminators are, for example, phenol, p-tert-butylphenol and long-chain alkylphenols, such as 4-(1,3-tetra-methylbutyl)phenol as in DE-A 28 42 005 or monoalkylphenols or dialkylphenols with from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl) phenol and 4-(3,5-dimethylheptyl)phenol.

Other suitable polycarbonates are those based on hydroquinone or resorcinol.

Besides the components A), B), C) and D), the thermoplastic molding compositions may also contain additives, such as lubricants and demolding aids, pigments, dyes, flame retardants, antioxidants, light stabilizers, fillers and reinforcing agents of fibrous or pulverulent character, and antistats, in the amounts usual for these agents. Especially when films are produced from the novel molding compositions, plasticizers are added, for example copolymers of from 30 to 70% by weight of ethylene oxide and from 70 to 30% by weight of 1,2-propylene oxide which have a mean molecular weight of from 2000 to 8000, in amounts of from 0.5 to 10% by weight, based on the total of components A), B), C) and, if used, D).

The novel molding compositions can be prepared by mixing processes known per se, for example by melting in an extruder, Banbury mixer, compounder, roll mill or calender. The components may, however, also be mixed "cold" without melting, and the mixture in the form of a powder or consisting of granules melted and homogenized only at the processing stage.

From the molding compositions it is possible to produce shaped articles of any type, in particular films and flat articles. Films may be produced by extrusion, rolling, calendering and other processes known to the person skilled in the art. The novel molding compositions are shaped by heating and/or friction, by themselves or with addition of plasticizing or other additives, to give a film which can be further processed or a flat article (sheet).

The novel thermoplastic molding compositions have better flowability than comparable molding compositions and at the same time have improved demoldability and thermoformability, show no reduction in coatability and are largely free from constituents which vaporize or exude.

They are suitable for producing films, shaped articles (especially sheets) which have excellent capability for further processing by thermoforming, and also for producing injection- moldings, especially for rapid processing with short cycle times.

EXAMPLES

The following constituents were prepared (all percentages are by weight)

A: Preparation of components A:
A1: Preparation of a component A-I:
Particulate graft polymer of crosslinked poly-n-butyl acrylate (core) and styrene/acrylonitrile copolymer (shell)

A mixture of 98 g of n-butyl acrylate and 2 g of dihydrodicyclopentadienyl acrylate and, separately, a solution of 1 g of sodium $C_{12}$–$C_{18}$-paraffinsulfonate in 50 g of water were added to a mixture of 3 g of a polybutyl acrylate seed latex, 100 g of water and 0.2 g of potassium persulfate, over 4 hours at 60° C., after which the polymerization was continued for a further 3 hours. The resultant latex had a mean particle diameter $d_{50}$ of 430 nm with a narrow particle size distribution (Q=0.1).

150 g of this latex were mixed with 60 g of water, 0.03 g of potassium persulfate and 0.05 g of lauroyl peroxide, after which, over a period of 3 hours at 65° C., first 20 g of styrene and then, over a period of a further 4 hours, a mixture of 15 g of styrene and 5 g of acrylonitrile were grafted onto the latex particles. The polymer was then precipitated using a calcium chloride solution at 95° C., separated, washed with water and dried in a stream of warm air. The degree of grafting of the polymer was 35% and the particles had a mean diameter $d_{50}$ of 510 nm.

The graft copolymer had the following composition (rounded values):

60% by weight of a graft core of polybutyl acrylate, crosslinked, 20% by weight of an inner graft of styrene polymer and 20% by weight of an outer graft of styrene-acrylonitrile copolymer with weight ratio S/AN of 3:1.

The seed polymer used at the start was prepared by the process of EP-B 6503 (column 12, line 55, to column 13, line 22) by polymerization of n-butyl acrylate and tricyclodecenyl acrylate in aqueous emulsion, and had a solids content of 40%.

The mean particle size mentioned in the description of component A) is the weight average of the particle sizes.

The mean diameter corresponds to the $d_{50}$ value, according to which 50% by weight of all particles have a smaller, and 50% by weight a larger, diameter than the diameter corresponding to the $d_{50}$ value. In order to characterize the width of the particle size distribution, the $d_{50}$ and the $d_{90}$ values are often stated in addition to the $d_{50}$ value. 10% by weight of all particles are smaller, and 90% by weight are larger, than the $d_{10}$ diameter. Analogously, 90% by weight of all particles have a smaller, and 10% by weight a larger, diameter than the diameter corresponding to the $d_{90}$ value. The quotient $Q=(d_{90}-d_{10})/d_{50}$ is a measure of the width of the particle size distribution. The smaller is Q, the narrower is the distribution.

A2: Preparation of a component A-II:
a) Preparation of a graft base A-II-1:
The preparation of the respective acrylate-based graft base ($a_{111}$ and $a_{112}$) was carried out according to the following general specification:

160 g of a mixture of 98% of butyl acrylate and 2% of dihydrodicyclopentadienyl acrylate (DCPA) were heated to 60° C., with stirring, in 1500 g of water, with addition of 5 g of the sodium salt of a $C_{12}$–$C_{18}$-paraffinsulfonic acid, 3 g of potassium peroxodisulfate, 3 g of sodium bicarbonate and 1.5 g of sodium pyrophosphate. 10 minutes after the initiation of the polymerization, a further 840 g of the mixture shown in the table were added over 3 hours. After monomer addition had ended, the emulsion was held at 60° C. for a further hour.

b) Preparation of a particulate graft polymer A-II:
2100 g of the emulsion prepared according to specification a) were mixed with 1150 g of water and 2.7 g of potassium peroxodisulfate and heated to 65° C., with stirring. After the reaction temperature was reached, 560 g of styrene-acrylonitrile in a ratio of 75:25 were added over 3 hours. When the addition was complete, the emulsion was held at 65° C. for a further 2 hours. The graft polymer was precipitated from the emulsion using calcium chloride solution at 95° C., washed with water, and dried in a stream of warm air.

A3: Preparation of a component A-III:
a) The preparation of the respective butadiene-based graft base ($a_{121}$ and $a_{122}$) was carried out according to the following specification:

A polybutadiene latex is prepared by polymerization at 65° C. of 600 g of butadiene in the presence of 6 g of tert-dodecyl mercaptan, 7 g of sodium $C_{14}$-alkylsulfonate as emulsifier, 2 g of potassium peroxodisulfate and 2 g of sodium pyrophosphate in 800 ml of water. The conversion is 98%. The resultant latex has a mean particle size of 100 nm. This latex is agglomerated by adding 25 g of an emulsion of a copolymer of 96 parts of ethyl acrylate and 4 parts of methacrylamide, with a solids content of 10% by weight, giving a polybutadiene latex with a mean particle size of 350 nm.

b) Preparation of a particulate graft polymer A-III:
After addition of 400 g of water, 4 g of sodium $C_{14}$-alkylsulfonate and 2 g of potassium peroxodisulfate to the graft base prepared to specification 3b, 400 g of a mixture of styrene and acrylonitrile (70:30) are fed in over 4 hours. The mixture polymerizes during stirring at 75° C. The conversion, based on styrene-acrylonitrile, is virtually quantitative. The resultant graft rubber dispersion is precipitated using magnesium sulfate solution, and the separated graft copolymer is washed with distilled water and dried.

Preparation of component B:
The preparation of component B was carried out by the continuous solution polymerization process as described in Kunststoff-Handbuch, Ed. R. Vieweg and G. Daumiller, Vol. V "Polystyrol", Carl-Hanser-Verlag, Munich 1969, pp. 122–124.

B1: Component B1:
Copolymer of styrene and acrylonitrile having 35% by weight of acrylonitrile (AN) and a viscosity number of 60 ml/g, measured as 0.5% strength solution in dimethylformamide according to DIN 53726.

B2: Component B2:
Copolymer of α-methylstyrene and acrylonitrile having 30% by weight of acrylonitrile and a viscosity number of 58 ml/g, measured as 0.5% strength solution in dimethylformamide according to DIN 53726.

B3: Component B3:
Copolymer of styrene and acrylonitrile having 35% by weight of acrylonitrile (AN) and a viscosity number of 80 ml/g, measured as 0.5% strength solution in dimethylformamide according to DIN 53726.

C: Preparation of component C:
A 50 l stainless steel autoclave provided with simultaneous heating and cooling and with a stirrer was prepared by flushing with nitrogen and scalding with a solution of sec-butyllithium and 1,1-diphenylethylene in cyclohexane, and drying. The autoclave was filled with 22.8 l of cyclohexane; 42 ml of sec-butyllithium and 65.8 ml of tetrahydrofuran were then added. The individual steps of the polymerization are shown in Table 1.

In each step, the duration of the monomer feed was small in comparison with the duration of the polymerization. The stated starting and/or final temperatures were set by heating and/or cooling of the reactor jacket.

At the end of the reaction (consumption of the monomers) the polymerization was terminated by titration with ethanol until the mixture was colorless, and the mixture was then acidified with a small excess of acid.

The solution was worked up at 200° C. on a vented extruder equipped with three vents and both forward and back venting. The resultant granules were used for preparing the molding composition.

TABLE 1

| Step | 1 | 2 | 3 | 4 | 5 |
|---|---|---|---|---|---|
| Butadiene feed [g] | — | 1120 | 1120 | 1120 | — |
| Styrene feed [g] | 1008 | 1412 | 1412 | 1412 | 1008 |
| $T_{start}$ [° C.] | 30 | 77 | 73 | 74 | 74 |
| $T_{finish}$ [° C.] | 77 | 102 | 95 | 88 | 85 |
| Duration of polymerization [min] | 12 | 14 | 10 | 26 | 14 |

The resultant polymer had the following mean molar masses (in g/mol) as determined by gel permeation chromatography (calibrated with polystyrene): number average $\overline{M}_n$ 119,000, viscosity average $\overline{M}_v$ 158,000 and weight average $\overline{M}_w$ 176,000.

The glass transition temperatures $T_g$ were determined by DSC and were −16° C. for the soft phase and +75° C. for the hard phase. The width of the glass transition, a measure of the homogeneity of the phase, was 9° C. for the soft phase and 12° C. for the hard phase.

The melt volume index MVI was determined at 200° C. and with a 5 kg load according to DIN 53 735, and was 8.5 ml/10 min.

The preparation of the novel molding compositions and of the comparative compositions was carried out on a Werner and Pfleiderer ZSK-30 extruder at 250° C. and 200 rpm and at 10 kg/h throughput. The product was cooled in a water bath and granulated, and tensile specimens were produced on an Arburg Allrounder injection-molding machine. Elongation at break was tested according to DIN 53504.

The measurement of flowability (MVI) was carried out according to DIN 53735 under the conditions given in the table.

The results are shown in the following table:

copolymer prepared by emulsion polymerization which is formed from $a_1$) from 30 to 90% by weight, based on A), of a graft base $a_{11}$) or $a_{12}$) or a combination of all) and $a_{12}$), where $a_{11}$) is an at least partially crosslinked acrylate polymer formed from $a_{111}$) from 50 to 99.9% by weight, based on $a_{11}$), of at least one $C_1$–$C_{10}$-alkyl acrylate, $a_{112}$) from 0.1 to 5% by weight, based on $a_{11}$), of a poly-functional crosslinking monomer, and $a_{113}$) from 0 to 49.9% by weight, based on $a_{11}$), of a further monomer which is copolymerizable with $a_{111}$) and is selected from the group consisting of the vinyl $C_1$–$C_8$-alkyl ethers, butadiene, isoprene, styrene, acrylonitrile, methacrylonitrile, methyl methacry- late, and mixtures thereof, and $a_{12}$) is a diene polymer formed from $a_{121}$) from 50 to 100% by weight, based on $a_{12}$), of a diene, and $a_{122}$) from 0 to 50% by weight, based on $a_{12}$), of other copolymerizable monomers selected from the group consisting of the vinyl $C_1$–$C_8$-alkyl ethers, $C_1$–$C_{10}$-alkyl acrylates, isoprene, styrene, acrylonitrile and methacrylonitrile, methyl methacrylate, and mixtures thereof, wherein the graft base has a $d_{50}$ of from 30 to 1000 nm, measured as weight average of the particle size, and $a_2$) from 10 to 70% by weight, based on A), of a shell grafted onto the graft base, formed from $a_{21}$) from 50 to 95% by weight, based on $a_2$, of a vinylaromatic monomer, $a_{22}$) from 5 to 50% by weight of polar, copolymerizable comonomers selected from the group consisting of acrylonitrile, methacrylonitrile, $C_1$–$C_4$-alkyl (meth) acrylates, maleic anhydride, maleimides, (meth) acrylamide, vinyl $C_1$–$C_8$-alkyl ethers, and mixtures thereof, B) from 1 to 90% by weight, based on the total weight of the molding composition, of a copolymer made from $b_1$) from 50 to 99% by weight of a vinylaromatic monomer, and $b_2$) from 1 to 50% by weight of monomers as described for $a_{22}$), C) from 1 to 70% by weight, based on the total weight of the molding composition, of an elastomeric block

TABLE

| | Example | | | | | | | | |
|---|---|---|---|---|---|---|---|---|---|
| Component | 1 comp. | 2 | 3 | 4 comp. | 5 | | 6 | 6 comp. | 7 | 7 comp. |
| A | 30 AIII | 30 AIII | 30 AIII | 18 AIII | 18 AIII | | 40 A I | 40 A I | 45 A II | 45 A II |
| B | 70 B1 | 65 B1 | 60 B1 | 5 B1 + 77 B2 | 4.75 B1 + 73.15 B2 | 55 B3 | 60 B3 | 50 B3 | 55 B3 |
| C | — | 5 | 10 | — | 5 | 5 C | — | 5 C | — |
| MVI [220° C./10 kg] | 15 | 21 | 24 | 5 | 6.5 | 5.5 | 2.5 | 6 | 2 |
| MVI [200° C./21.6 kg] | 22 | 29 | 36 | not det. | not det. | — | — | — | — |
| Elongation at break [%] | 8 | 12 | 16 | 8 | 10 | 26 | 20 | 31 | 25 |
| Vicat B50/° C. | not det. | not det. | not det. | 111 | 110.3 | — | — | — | — |

1) Examples 1 comp., 4 comp., 6 comp. and 7 comp. are comparative examples
The results show that the novel molding compositions have a balanced property profile.

We claim:

1. A thermoplastic molding composition consisting of

A) from 5 to 98% by weight, based on the total weight of the molding composition, of an elastomeric graft copolymer comprising at least one block $C_A$ which forms a hard phase and has in its polymer chain units of a vinylaromatic monomer, and at least one elastomeric block $C_{B/A}$ which forms a soft phase, and has in its polymer chain units of both a vinylaromatic monomer and a diene, where the glass transition temperature $T_g$ of the block $C_A$ is above 25° C. and that of the block $C_{B/A}$ is below 25° C. and the phase volume ratio of block $C_A$ to block $C_{B/A}$ is selected so that the proportion of the hard phase in the entire block copolymer is from 1 to 40% by volume, and the proportion by weight of the diene is less than 50% by weight, and where the elastomeric block copolymer is represented by a formula selected from the group consisting of $C_1$) $(C_A\text{-}C_{B/A})_n$,
$C_2$) $(C_A\text{-}C_{B/A})_n\text{-}C_A$,
$C_3$) $C_{B/A}\text{-}(C_A\text{-}C_{B/A})_n$,
$C_4$) $X\text{-}[(C_A\text{-}C_{B/A})_n]_{m+1}$,
$C_5$) $X\text{-}[(C_{B/A}\text{-}C_A)_n]_{m+1}$,
$C_6$) $[X\text{-}[(C_A\text{-}C_{b/a})_{n\text{-}A}]_{m+1},] X\text{-}[(C_a\text{-}C_{B/A})_n\text{-}C_a]_{m+1}$,
$C_7$) $X\text{-}[C_{B/A}\text{-}C_A)_n\text{-}C_{B/A}]_{m+1}$,
$C_8$) $Y\text{-}[(C_A\text{-}C_{B/A})_n]_{m+1}$,
$C_9$) $Y\text{-}[(C_{B/A}\text{-}C_A)_n]_{m+1}$,
$C_{10}$) $[Y\text{-}[(C_A\text{-}C_{B/A})_{n\text{-}A}]_{m+1}] Y\text{-}[(C_A\text{-}C_{B/A})_n\text{-}C_A]_{m+1}$ and
$C_{11}$) $[Y\text{-}[(C_{B/A}\text{-}C_A)_{n\text{-}B/A}]_{m+1},] Y\text{-}[(C_{B/A}\text{-}C_A)_n\text{-}C_{B/A}]_{m+1}$, where X is a radical of an n-functional initiator, Y is a radical of an m-functional coupling agent, and m and n are natural numbers from 1 to 10, D) from 0 to 300% by weight, based on the weight of components A) to C), of an aromatic polycarbonate, E) from 0 to 20% by weight, based on the total weight of the molding composition, of conventional additives and processing aids.

2. The thermoplastic molding composition defined in claim 1, wherein the graft base of the graft copolymer A) is a diene polymer $a_{12}$).

3. A shaped article obtained using a thermo-plastic molding composition defined in claim 1.

4. The thermoplastic molding composition defined in claim 1, wherein the graft base of the graft copolymer A) is an at least partially crosslinked acrylate polymer $a_{11}$).

5. The thermoplastic molding composition defined in claim 1, wherein the soft phase of the block copolymer C is composed of blocks selected from the group consisting of $(C_{B/A})_1\text{-}(C_{B/A})_2$, $(C_{B/A})_1\text{-}(C_{B/A})_2\text{-}(C_{b/a})_1$, and $(C_{B/A})_1\text{-}(C_{B/A})_2\text{-}(C_{B/A})_3$, where the ratio of vinylaromatic to diene differs in the individual blocks $(C_{B/A})_1$, $(C_{B/A})_2$ and $(C_{B/A})_3$, or it changes continuously within the block within the limits $(C_{B/A})_1 \rightarrow (C_{B/A})_3$, and where the glass transition temperature $T_g$ of the individual blocks $(C_{B/A})_1$, $(C_{B/A})_2$ and $(C_{B/A})_3$ is below 25° C.

6. The thermoplastic molding composition defined in claim 1, wherein the block copolymer C comprises a number of blocks $C_A$ or $C_{B/A}$ with a differing molar mass in each molecule.

7. A shaped article obtained using a thermoplastic molding composition defined in claim 2.

8. The thermoplastic molding composition defined in claim 1, wherein the graft base of the graft copolymer A) is the acrylate polymer $a_{11}$) or is a mixture of the acrylate polymer $a_{11}$) and the diene polymer $a_{12}$).

9. A shaped article obtained using a thermoplastic molding composition defined in claim 11.

10. The thermoplastic molding composition defined in claim 1, wherein the graft base of the graft copolymer A) has a $d_{50}$ of from 50 to 800 nm.

11. The thermoplastic molding composition defined in claim 1, wherein the graft base a12) of the graft copolymer A) has a $d_{50}$ of from 100 to 750 nm.

* * * * *

UNITED STATES PATENT AND TRADEMARK OFFICE
CERTIFICATE OF CORRECTION

PATENT NO. : 6,177,517 B1　　　　　　　　　　　　　　　　　　　　　　Page 1 of 1
DATED : January 23, 2001
INVENTOR(S) : Guentherberg et al.

It is certified that error appears in the above-identified patent and that said Letters Patent is hereby corrected as shown below:

Column 14, claim 1,
Line 4, "a11)" should be -- $(a_{11})$ --.
Line 16, "methacry- late" should be -- methacrylate --.

Column 15, claim 1,
Line 18, "$[X-[C_A-C_{b/a})_{n-A}]_{m+1}]$ $X-[(C_a-C_{B/A})_n-C_a]_{m+1}$," should be
-- $X-[(C_A-C_{B/A})_n-C_A]_{m+1}$ --.
Line 21, "$[Y-[C_A-C_{b/a})_{n-A}]_{m+1}]$ $Y-[(C_a-C_{B/A})_n-C_a]_{m+1}$," should be
-- $Y-[(C_A-C_{B/A})_n-C_A]_{m+1}$ --.
Line 22, "$[Y-[_{B/A}-C_{B/A})_{n-A}]_{m+1}]$ $Y-[(C_a-C_{B/A})_n-C_{B/A}]_{m+1}$," should be
-- $Y-[(C_{B/A}-C_A)_n-C_{B/A}]_{m+1}$ --.

Column 16, claim 5,
Line 9, "$(C_{b/a})^1$" should be -- $(C_{B/A})^1$ --.

Signed and Sealed this

Eleventh Day of December, 2001

Attest:

NICHOLAS P. GODICI
*Attesting Officer*　　　*Acting Director of the United States Patent and Trademark Office*